United States Patent [19]

Neier

[11] 3,976,186

[45] Aug. 24, 1976

[54] ENSILAGE LOADER

[75] Inventor: Benjamin R. Neier, Dodge City, Kans.

[73] Assignee: B/J Manufacturing Co., Inc., Dodge City, Kans.

[22] Filed: Feb. 24, 1975

[21] Appl. No.: 552,443

[52] U.S. Cl. .................................... 198/8; 299/75
[51] Int. Cl.² ......................................... B65G 65/06
[58] Field of Search ............ 299/75; 173/38; 198/9, 198/8, 10, 11

[56] References Cited
UNITED STATES PATENTS

| | | | |
|---|---|---|---|
| 2,751,204 | 6/1956 | Sibley | 198/9 X |
| 3,195,656 | 7/1965 | Johnson et al. | 173/38 |
| 3,391,776 | 7/1968 | Hancock et al. | 198/10 X |
| 3,724,559 | 4/1973 | Stromnes | 173/38 X |
| 3,724,635 | 4/1973 | Byrd | 198/9 |
| 3,847,266 | 11/1974 | Cox | 198/9 |

Primary Examiner—Albert J. Makay
Attorney, Agent, or Firm—Fishburn, Gold & Litman

[57] ABSTRACT

An ensilage loader for removing ensilage from a body of ensilage, as in a trench silo, stack or other storage and discharging same into a receiver, such as a feed mixer or the like, is mounted on a mobile frame and includes an ensilage receiver adjacent one end of the frame to receive ensilage removed from the face of the ensilage body and having operative members to move same into a conveyor or elevator for delivery thereof to a feed mixer or the like. The ensilage loader includes a digger mounted on a boom having one end mounted on the frame and arranged with power members in a manner for selective raising and lowering of the digger, extension and contraction of the boom with lateral movement relative to the ensilage receiver. The loader includes controls whereby the digger cuts into a face of the ensilage body leaving a substantially vertical face without an overhang and moves the ensilage into the ensilage receiver.

6 Claims, 8 Drawing Figures

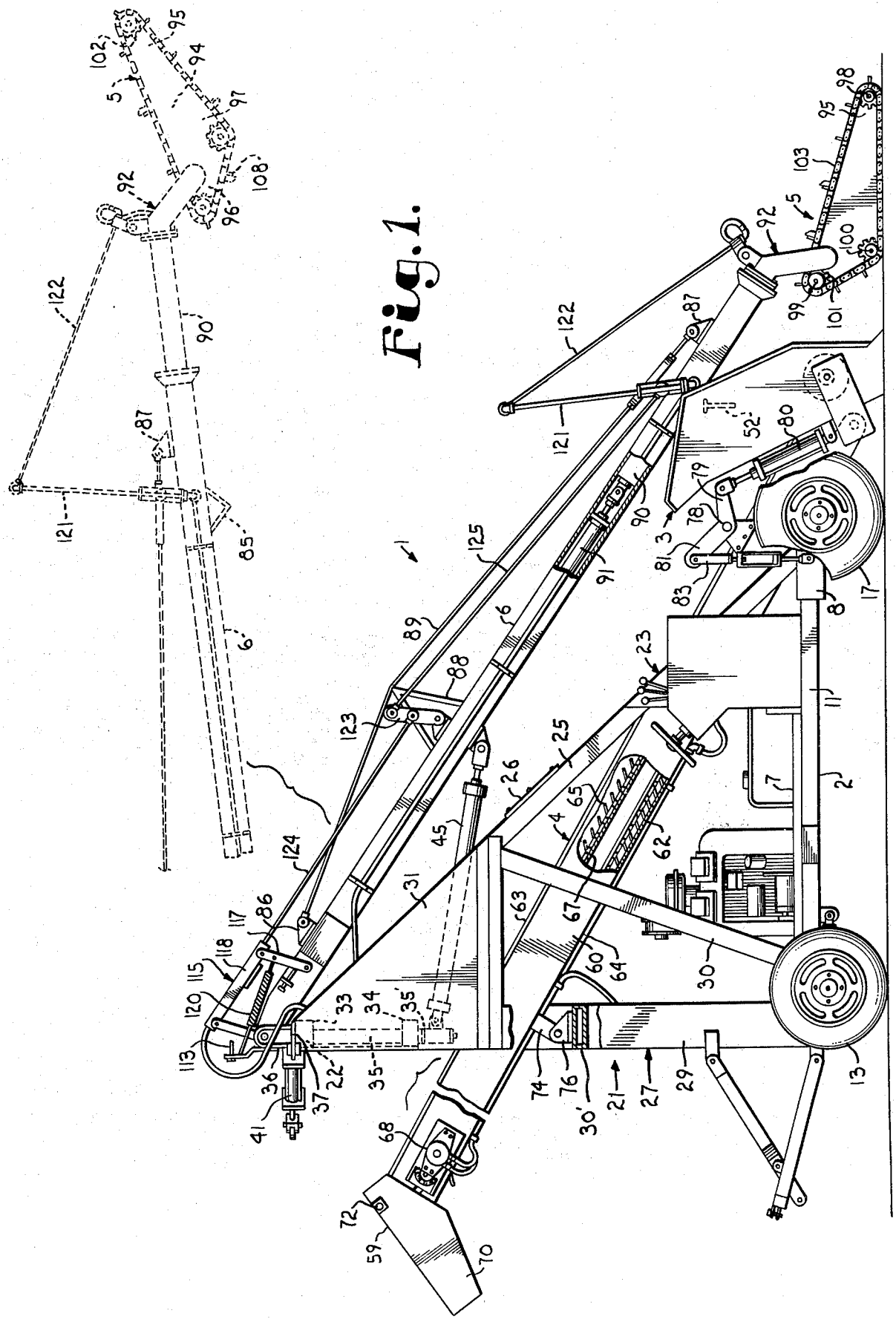

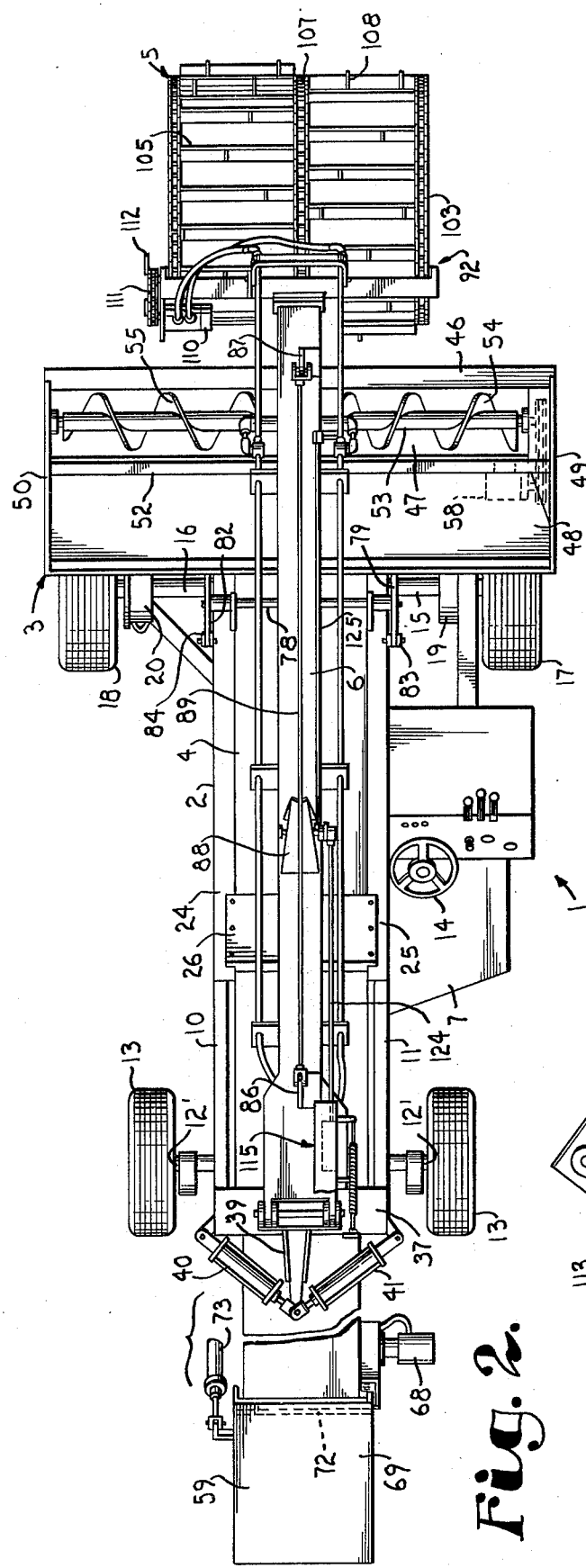
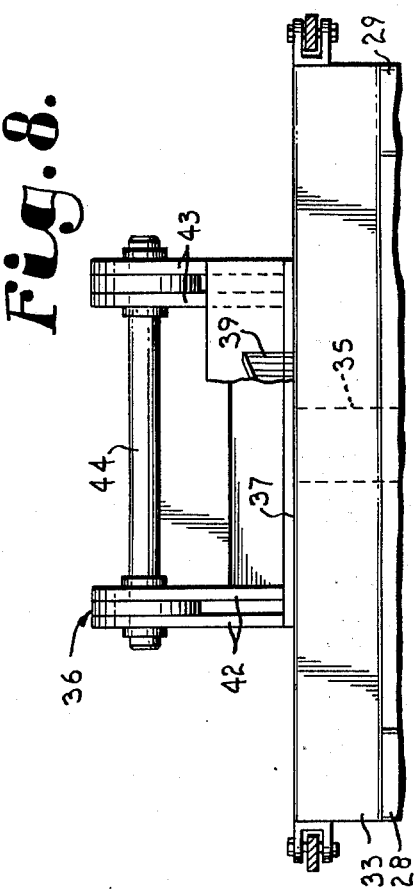
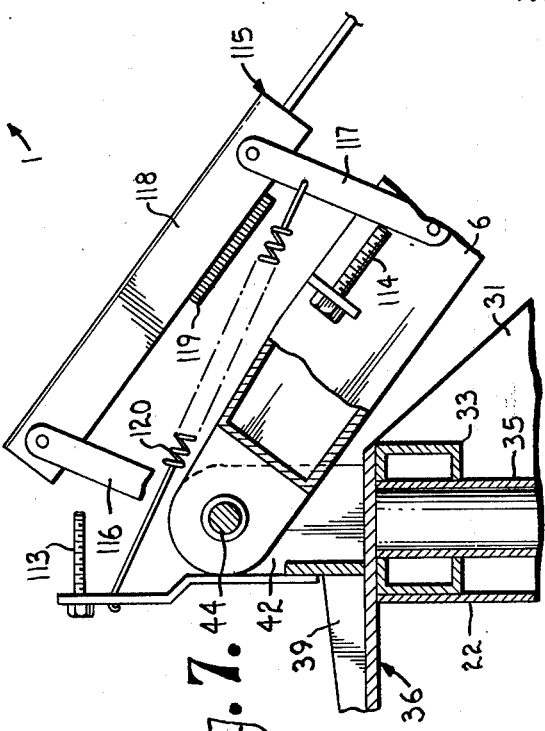

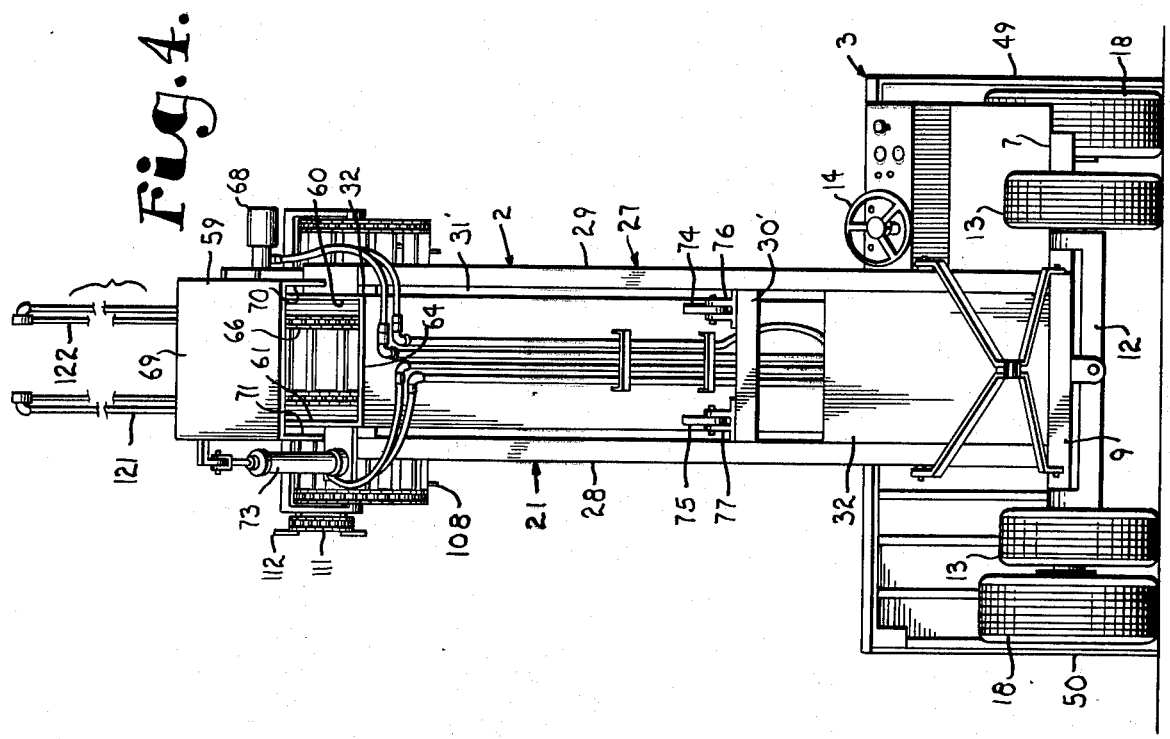
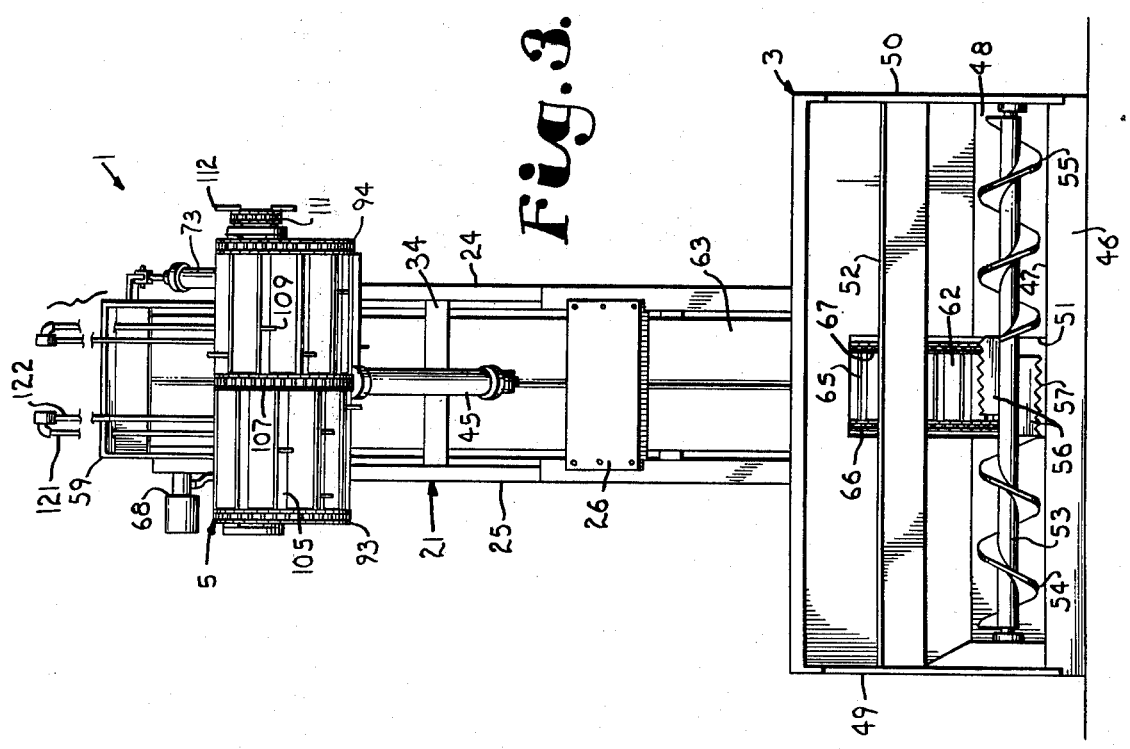

ENSILAGE LOADER

The present invention relates to ensilage loaders and more particularly to an ensilage loader for removing ensilage from an ensilage body and discharging same into a feed mixer or the like, all in a manner to form a cut in a face of the ensilage stack without an overhang.

In the cattle industry, ensilage commonly forms a portion of the feed ration for cattle, particularly in the feeding of the cattle for preparation for market. Large quantities are required and the common practice is to provide what is called trench silos, which preferably have a concrete floor and upstanding side walls and one end wall forming an open top, a structure with one open end for access to the material. Such silos can be very substantial in size as for example, 25 to 100 feet in width and any desired length, which may be as long as more than 500 feet. Ensilage is placed in the trench at the closed end and packed with repeated loads of ensilage until there is a desired height to the accumulation. It is common practice to have a depth of 15 feet or more. The top of the ensilage in the trench is preferably covered with suitable material to protect same from water, as for example, by a plastic film. It is also common practice to cover the film with suitable weights, as for example, a plurality of old tires, to hold the plastic in place and also provide weight on the top of the ensilage. When ready for use, the ensilage is usually removed by high loaders having buckets on arms that move upwardly in an arc, with the result that the face of the ensilage stack will project outwardly at the top forming an overhang which will break off and could fall on a person causing injury.

The principal object of the present invention are: to provide an ensilage loader for safely removing ensilage from an ensilage body and discharging same into a feed mixer or the like; to provide such an ensilage loader having an ensilage digger and controls therefor adapted to move the digger in a manner to form a cut in a face of an ensilage body without an overhang; to provide such an ensilage loader and ensilage digger wherein the digger is mounted on a boom which is selectively raised and lowered and moved laterally relative to an ensilage receiver; to provide such a structure in which the digger is selectively extended and retracted relative to a supporting frame and adapted to move ensilage toward and into the ensilage receiver; to provide such a structure with an extendable and contractable boom mounting the digger and controls and power means for effecting such extension and contraction in response to raising and lowering of said boom; to provide such a structure with the digger having a plurality of spaced blades each having a face movable toward the ensilage receiver to thereby move ensilage toward and into the receiver; to provide such an ensilage loader wherein the blades of the ensilage digger each have the face positioned with the long dimension thereof substantially parallel with the ensilage receiver and of a dimension less than the width of the ensilage receiver whereby the ensilage digger may make a plurality of cuts while the ensilage receiver is in one position; to provide such a structure with an elevation or conveyor structure for moving ensilage from the receiver to a delivery point; to provide such a structure with a collector and impeller in the receiver for delivery of the insilage to the conveyor structure; and to provide such an ensilage loader which is durable in construction, positive in operation, economical to manufacture, and particularly well adapted for the proposed use.

Other objects and advantages of this invention will become apparent from the following description taken in connection with the accompanying drawings wherein are set forth, by way of illustration and example, certain embodiments of this invention.

The drawings constitue a part of the specification and include an exemplary embodiment of the present invention and illustrate various objects and features of the ensilage loader.

FIG. 1 is a side elevational view of an ensilage loader embodying features of the present invention with portions broken away to better illustrate component parts and showing alternate positions of a boom and an ensilage digger in broken lines.

FIG. 2 is a top plan view of the ensilage loader.

FIG. 3 is an elevational view of one end of the ensilage loader showing the ensilage digger and an ensilage receiver.

FIG. 4 is an elevational view of the other end of the ensilage loader and showing a chute or elevator for discharge of ensilage from the ensilage loader.

FIG. 7 is an enlarged side elevational view of an upper end of the boom and showing means for control of extension and retraction of the digger and showing alternate positions of the boom in broken lines.

FIG. 8 is a partial elevation view of the upper end of the tower mounting the boom taken from the end adjacent the elevator discharge.

Figure 5:
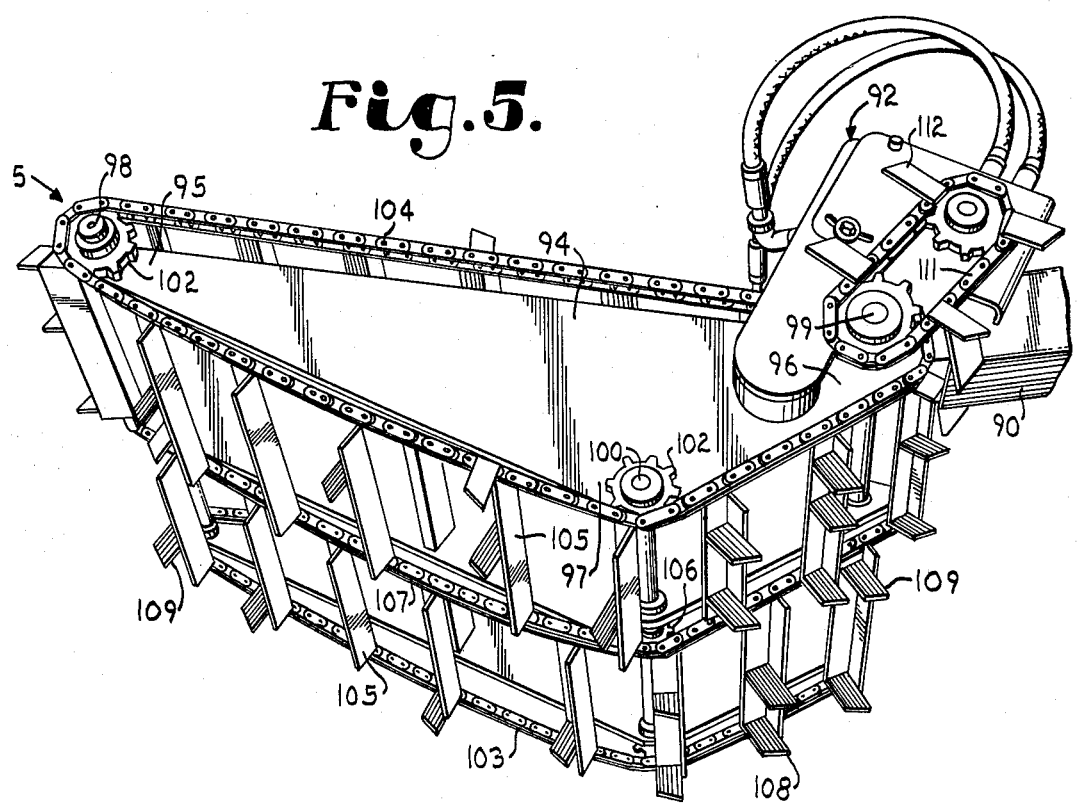
FIG. 5 is an enlarged perspective view of the ensilage digger showing an ensilage engaging portion thereof.
Figure 6:
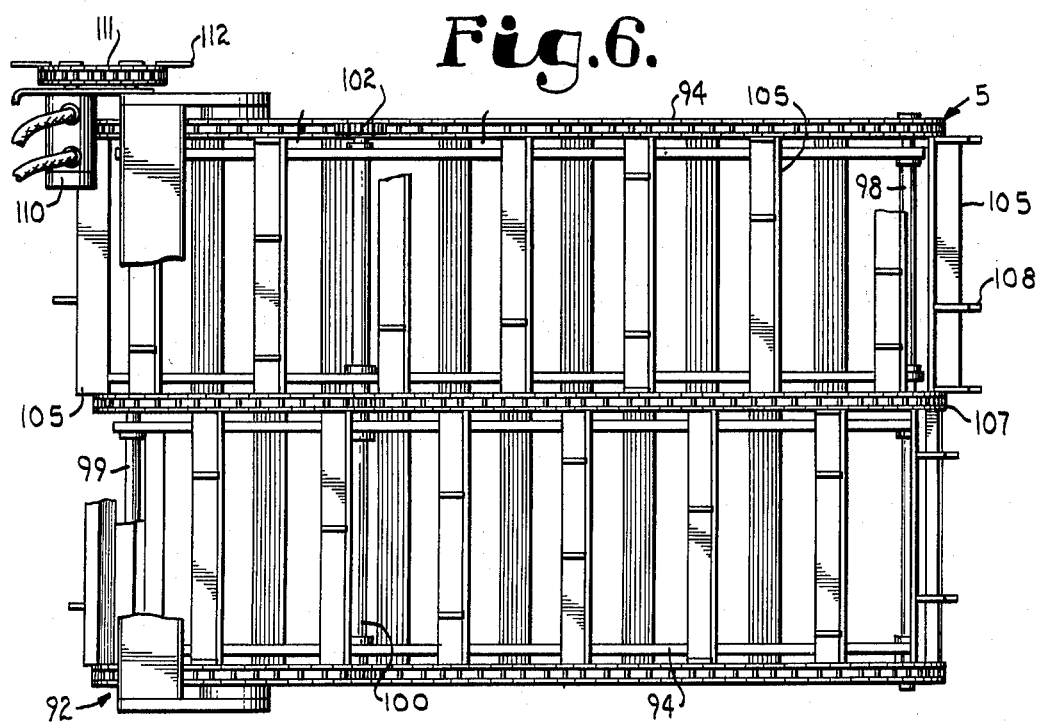
FIG. 6 is an enlarged top plan view of the ensilage digger.

Referring more in detail to the drawings:

As required, detail embodiments of the present invention are disclosed herein, however, it is to be understood that the disclosed embodiments are merely exemplary of the invention which may be embodied in various forms, therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates an ensilage loader for removing ensilage from an ensilage body as in a trench and discharging same into a container or the like, for example, a mobile feed mixer (not shown). The loader 1 is mounted on a mobile frame 2 and includes a receiver 3 adjacent one end of the frame 2 to receive ensilage removed from the ensilage body and with structure to move same into a conveyor or elevator 4 adapted to carry the ensilage therefrom to a point of discharge. The loader 1 includes a digger 5 mounted on a boom 6 having one end mounted on the frame 2 in a manner to permit selectively raising and lowering the digger 5 and selectively moving same laterally of the receiver 3. The digger 5 is mounted on the boom 6 to permit the digger to be selectively extended and retracted in a manner to form a cut in a face of the ensilage body without an overhang and to move the ensilage into the receiver 3.

The mobile frame 2 may be any suitable structure adapted to support the receiver 3, elevator 4, boom 6, and digger 5 thereon. The mobile frame 2 also provides an operator's platform 7 and in the illustrated structure, the frame 2 includes a front end member 8 and a rear end member 9 and laterally spaced opposite side members 10 and 11.

The mobile frame 2 has means for effecting selected forward and reverse movement of the loader 1 and in the illustrated structure, a rear axle beam 12 or like member is supported on the frame 2 adjacent the rear end member 9 and has suitable rear wheels 13 rotatably mounted at respective opposite ends of said axle beam 12. Front axles 15 and 16 are mounted on the frame 2 and positioned adjacent the front end member 8 and have suitable front wheels 17 and 18 respectively mounted thereon. It is preferred that the front wheels be driven by any suitable power train and in the illustrated structure, hydraulic motors 19 and 20 are operatively connected to the right and left front wheels 17 and 18 respectively. For steering the loader the wheels 13 are rotatably carried by axles 12' which are mounted on the ends of the beam 12 for pivotal movement whereby the wheels are selectively turned by steering apparatus under control of a steering wheel 14 to control travel of the loader and maneuvering thereof.

The boom 6 and elevator 4 are supported on the frame by super-structure for each or both. In the illustrated structure, the front and rear end members 8 and 9 and the side members 10 and 11 of the mobile frame 2 define a base portion of the frame 2 and provide support for a super-structure or tower 21 extending upwardly therefrom and having an upper end 22. The tower 21 shown is similar to an A-frame and includes a front frame 23 having side legs 24 and 25 extending upwardly and rearwardly from the front end member 8 of the base portion of the frame 2. The front frame 23 includes suitable bracing members 26 extending between the side legs 24 and 25 to form a suitably rigid front frame 23.

The tower 21 includes a rear frame 27 extending upwardly from the rear end member 9 and having side legs 28 and 29. The rear frame 27 has suitable bracing members extending between the side legs 28 and 29 to form a substantially rigid rear frame 27.

The tower 21 includes suitable bracing between the front frame 23 and the rear frame 27 to provide a substantially rigid structure. In the illustrated embodiment, side braces 30 extend upwardly and forwardly from the side members 10 and 11 respectively adjacent the rear frame 27 and have upper ends suitably secured to the front side legs 24 and 25 respectively intermediate the ends thereof. The tower also has plate members 31 secured to upper portions of the side legs 24 and 28, and the side legs 25 and 29. Plate members 32 are secured to the rear frame legs 28 and 29 adjacent the upper and lower ends providing a space 31' between said plate members 32.

The boom 6 is mounted on the upper end 22 of the tower 21 in a manner permitting raising and lowering of the boom 6 and lateral movement of the boom 6 and digger 5. In the illustrated embodiment, the rear frame 27 has vertically spaced upper and lower frame members 33 and 34 respectively extending laterally between the rear side legs 28 and 29 of the rear frame 27. An upstanding sleeve member 35 has upper and lower ends thereof suitably supported on the upper and lower frame members 33 and 34 respectively. The upstanding sleeve member 35 defines an axis for turning or swinging of the boom 6 to move the digger 5 laterally of the receiver 3, for a purpose later described.

The boom 6 is sectional and has one end mounted on the tower 21. One section of the boom 6 has a mounting portion 36 mounted on the upper end 22 of the tower 21. The mounting portion 36 has a base 37 positioned above upper ends of the front frame 23 and the rear frame 27. Suitable bearings are positioned between the upper end 22 of the tower 21 and the mounting portions base 37 to permit turning of the mounting portion 36 and the boom 6 relative to the tower 21.

The mounting portion 36 has a rearwardly extending arm 39 with extensible members extending between the boom 6 and tower 21 for selectively effecting turning of the mounting portion 36 and thereby movement of the boom 6 and digger 5 mounted thereon laterally of the receiver 3. In the illustrated structure, first and second extensible members 40 and 41 each extend between the upper end 22 of the tower 21 and the rearwardly extending arm 39 and are thereby operative to selectively turn the mounting portion 36 and thereby swing the boom 6 and digger 5 thereon.

The mounting portion 36 includes a pair of laterally spaced ears 42 and 43 extending upwardly from the base 37 and having a suitable axle 44 extending therebetween and rotatably supported on the ears 42 and 43, as in suitable bearings, to thereby define a generally horizontal axis for movement of the boom 6 during raising and lowering of the digger 5.

The boom 6 has one end thereof pivotally mounted on the axle 44 and the one end of the boom 6 is preferably positioned between the ears 42 and 43 for pivotal movement about the axle 44. An extensible member 45 extends between the tower 21 and an intermediate portion of the boom 6 for selectively raising and lowering the boom 6. In the illustrated structure, one end of the extensible member 45 is pivotally connected to an elongated shaft 35' depending from the base 37 and rotatably received in the upstanding sleeve 35 and the other end of the extensible member 45 is pivotally connected to a suitable bracket mounted on the boom 6.

The receiver 3 is adapted to receive ensilage removed from an ensilage body and moved thereinto by the digger 5. The receiver 3 as illustrated has an inclined apron or entrance portion 46 extending upwardly and rearwardly from a forward edge thereof and joining a generally level bottom wall 47 extending rearwardly from the upper and rear edge of the apron or entrance portion 46. The receiver 3 includes a rear wall 48 extending upwardly and rearwardly from a rear edge of the bottom wall 47. Opposed end walls 49 and 50 are connected to respective opposite ends of the bottom wall 47 and the rear wall 48 to define a compartment having an open front permitting movement of ensilage thereinto by the ensilage digger 5. The rear wall 48 of the receiver 3 has a discharge opening 51 therein which communicates with the elevator 4 for movement of ensilage from the receiver 3 into the elevator 4.

A bracing member 52 extends between the end walls 49 and 50 and has respective opposite ends thereof supported on the end walls 49 and 50. The bracing member 52 is positioned above the bottom wall 47 and spaced forwardly of the rear wall 48. The bracing member 52 has an upper surface adapted to be engaged by a forward end portion of the boom 6 and provide a lower limit of downward movement of the boom and thereby position the digger 5 for moving the ensilage removed from the ensilage body into the receiver 3.

The receiver 3 has suitable material moving means therein adapted to move material into and through the discharge opening 51 in the rear wall 58. In the illustrated structure, an elongated shaft 53 extends between and has respective opposite ends thereof rotatably mounted in bearings supported on the end walls 49 and 50 of the receiver 3. The elongated shaft 53 has first and second helicoid auger flights 54 and 55 of opposite hand or spiral respectively mounted thereon whereby each is operative to move material toward the center of the receiver 3 and thereby position same adjacent the discharge opening 51 in the rear wall 48 in response to rotation of the shaft 53.

A plurality of circumferentially spaced paddles or blades 56 are mounted on the elongated shaft 53 and positioned between adjacent ends of the first and second auger flights 54 and 55. The paddles 56 each extend radially from the center portion of the elongated shaft 53 and have a plurality of teeth 57 fromed in the outer edge thereof and move the ensilage toward the discharge opening 51 during rotation of the elongated shaft 53. The teeth 57 on adjacent paddles 56 are staggered to thereby provide portions for the full width for moving the ensilage. The teeth 57 also help break up the ensilage for movement into the elevator 4.

Suitable drive means, such as a hydraulic motor 58, is mounted on the receiver 3 and is operatively connected to the elongated shaft 53, as by an endless chain mounted on a sprocket on the motor 58 and on a sprocket on the shaft 53.

The elevator 4 receives the ensilage from the receiver 3 and moves same to an upper end for discharge into a truck, feed mixer, or the like receiver (not shown). The elevator 4, as shown, is constructed to define a closed passage from the receiver 3 to a discharge head 59. The illustrated elevator 4 extends upwardly and outwardly from the receiver 3 and has a pair of facing side walls 60 and 61 with a material or ensilage supporting floor 62 extending between and having opposite edges thereof supported on the side walls 60 and 61. The floor 62 is positioned intermediate respective upper and lower edges of the side walls 60 and 61. The elevator 4 is closed by upper and lower cover members 63 and 64 extending between the side walls 60 and 61 adjacent the upper and lower edges thereof respectively.

The elevator 4 includes a conveyor of the drag type and has a plurality of spaced drag bars or scrapers 65 mounted for movement in an endless path between and around opposite ends of the floor 62. In the illustrated structure, a respective shaft is positioned adjacent each of the opposite ends of the floor 62 and the shaft each have suitable sprockets on each end thereof. Endless chains 66 and 67 extend around the sprockets on opposite ends of each of the shafts positioned adjacent the opposite ends of the floor 62 and the chains 66 and 67 are positioned adjacent and between the side walls 60 and 61 respectively. The scrapers 65 each have respective opposite ends thereof connected to the chains 60 and 67 and the scrapers 65 each have one edge thereof movable in engagement with the floor 62. One of the shafts positioned adjacent a respective one of the opposite ends of the floor 62 has drive means operatively connected thereto for moving the scrapers 65 in an endless path around the opposite ends of the floor 62. In the illustrated structure, a drive motor 68 is mounted on the elevator 4 adjacent the upper end thereof and is operative to drive the shaft adjacent the upper end of the floor 62, as by an endless chain extending around respective sprockets.

The elevator 4 has means mounted on the upper end thereof to direct the ensilage from the elevator 4 and into a suitable receptacle, such as a feed mixer, or the like. In the illustrated structure, the discharge head 59 is pivotally mounted on the upper end of the elevator 4 and has an end wall 69 and side walls 70 and 71 extending from the end wall 69 and positioned adjacent the side walls 60 and 61 respectively of the elevator 4. An elongated shaft 72 extends through the side walls 60 and 61 of the elevator 4 and the side walls 70 and 71 of the discharge head 59 to permit the discharge head 59 to be adjusted relative to the open or upper end of the elevator 4.

The end wall 69 of the discharge head 59 may be moved to a selected position and serve as a baffle to deflect and direct flow of the ensilage from the elevator 4 to a suitable receptacle. In the illustrated structure, and extensible member 73 has one end thereof connected to the discharge head 59 and another end connected to the elevator 4 and is operative to selectively move the end wall 69 of the discharge head 59 relative to the upper end of the elevator 4.

It is desirable that the lower end of the elevator 4 and the receiver 3 be selectively moved between a raised position for transit and a lowered position for receiving ensilage from the digger 5. An intermediate portion of the elevator 4 is pivotally supported on tower 21 and in the illustrated structure, ears 74 and 75 depend from the side walls 60 and 61 respectively and are pivotally mounted on brackets 76 and 77 respectively extending upwardly from an elevator support member 30' mounted on the tower 21.

Means are mounted on the lower end of the elevator 4 and the front end of the base portion of the mobile frame 2 to effect selective movement of the lower end of the elevator 4 relative to the base portion of the frame 2. In the illustrated structure, an elongated shaft 78 is positioned above a lower end of the elevator 4 and is rotatably supported on suitable brackets extending upwardly from the side walls 60 and 61 of the elevator 4. One end of the elongated shaft 78 has an arm 79 extending therefrom and one end of an extensible member 80 pivotally connected to an outer end of the arm 79. The outer end of the extensible member 80 is pivotally mounted on the lower end of the elevator 4 or may be pivotally connected to the rear wall 48 of the receiver 3 whereby operation of the extensible member 80 effects selected turning of the elongated shaft 78 relative to the elevator 4.

Opposite ends of the elongated shaft 78 each have first links 81 and 82 respectively extending therefrom. The first links 81 and 82 each have one end thereof secured to the respective end of the elongated shaft 78, as by welding. Second links 83 and 84 have one end thereof pivotally connected to the first links 81 and 82 respectively at a position spaced from the elongated shaft 78. The second links 83 and 84 have the other respective end thereof pivotally connected to the base portion of the mobile frame 2 whereby retraction of the extensible member 80 is effective to move the lower end of the elevator 4 and the ensilage receiver 3 toward the front end of the mobile frame 2 and extension of the extensible member 80 is effective to raise the receiver 3 and the lower end of the elevator 4 relative to the mobile frame 2, such as for transit.

The boom 6 is illustrated as an elongated tubular member having one end thereof pivotally mounted on the axle 44 and having the extensible member 45 connected thereto at a position intermediate the ends of a first section of the boom 6. A stop 85 is mounted on the boom 6 adjacent the other end thereof and the stop 85 is adapted to engage the bracing member 52 thereby defining a lower limit for downward movement of the boom 6 and the digger 5 relative to the apron or entrance portion 46 of the receiver 3.

It is desirable to strengthen the boom 6 and particularly that portion extending beyond the connection of the extensible member 45 to the boom 6. In the illustrated structure, a truss is formed in combination with the elongated tubular member. Brackets 86 and 87 are mounted adjacent respective opposite ends of the boom 6 and a center bracket 88 is positioned intermediate the brackets 86 and 87. A cord member 89 extends between the bracket 86 and the center bracket 89 and extends from the center bracket 89 to the bracket 87 thereby defining a substantially rigid structure for the boom 6.

A second boom section 90 is telescopingly received in the elongated tubular member of the boom 6 and is mounted for selective extension and retraction relative to the adjacent end of the boom 6. The boom 6 and the second boom section 90 are preferably corresponding non-round sections whereby relative rotation between a first section of the boom 6 and the second boom section 90 is substantially restricted during extension and retraction of the boom 6.

A suitable extensible member 91 is positioned within the tubular member of the boom 6 and has one end thereof connected to the second boom section 90 and the other end connected to the boom 6 whereby extension of the extensible member 91 moves the second boom section 90 outwardly from the adjacent end of the boom 6 and retraction of the extensible member 91 moves the second boom section 90 toward the adjacent end of the boom 6.

The extensible member 91 is mounted within the tubular first section of the boom 6 and has a reciprocating portion connected to the second boom section 90 whereby the second boom section 90 may be selectively extended and retracted.

The digger 5 has a digger frame 92 having one end thereof mounted on the second boom section 90 and the digger frame 92 is sized to provide at least one digger unit adapted to remove material from an ensilage body and move same into the receiver 3. In the illustrated structure, the digger frame 92 has laterally spaced side members or walls 93 and 94 each having opposite ends. The illustrated side walls or members 93 and 94 are generally triangular in shape and each have a front end or corner 95, a rear end or corner 96, and a bottom corner 97. The bottom corner 97 is positioned below and intermediate the front corner 95 and the rear corner 96.

A front shaft 98 extends between and has opposite ends thereof rotatably supported at the front corner 95 of the side members 93 and 94 respectively and a rear shaft 99 extends between and has opposite ends thereof rotatably mounted at the rear corner 96 of the side members 93 and 94 respectively. A bottom shaft 100 is positioned substantially parallel with the front shaft 98 and the rear shaft 99 and extends between and has opposite ends thereof rotatably mounted at the bottom corner 97 of the side members 93 and 94 respectively.

Sprockets 101 and 102 are mounted on respective opposite ends of the shafts 98, 99, and 100 and positioned outwardly of and adjacent the side walls 93 and 94 respectively. The sprockets 101 and 102 have endless chains 103 and 104 respectively in engagement therewith for movement in an endless path defined by the positions of said sprockets.

The ensilage digger 5 has at least one set of a plurality of elongated bades 105 extending transversely between adjacent endless chains 103 and 104 and mounted in spaced apart relation. The blades 105 are illustrated as angles with one face or leg of each of the blades 105 being movable toward the receiver 3 in an endless path around the opposite ends of the digger frame 92. The endless path has one portion for movement of the one leg of the elongated blades 105 toward the receiver 3 when the digger 5 is positioned adjacent thereto.

When the digger 5 is in a raised position and in engagement with an ensilage body, the one face of the elongated blades 105 each move downwardly along the exposed face of the ensilage body to remove material therefrom. The blades 105 adjacent the front end 95 of the frame side members 93 and 94 engage the material to remove same from the ensilage body. When the digger 5 is in a lowered position, the one face of the elongated blades 105 each move toward the receiver 3 to move the removed material thereinto.

In the illustrated structure, a center sprocket 106 is mounted on each of the front, rear, and bottom shafts 98, 99, and 100 respectively and an endless chain 107 extends around the center sprockets 106 on the front, rear, and bottom shafts 98, 99, and 100 respectively. The elongated blades 105 are formed in a first portion extending transversely between the endless chain 103 and the endless chain 107 and a second portion extending transversely between the endless chain 107 and the endless chain 104. The first and second portions of the elongated blades 105 are staggered to assist in breaking up the ensilage as same is removed from the ensilage body and moved toward the receiver 3.

The digger frame 92 has a width substantially less than the width of the receiver 3 whereby the digger 5 may make a plurality of cuts in the ensilage body (not shown) while the receiver 3 and the mobile frame 2 is in one position.

The ensilage is preferably at least partially broken up during removal from the ensilage body, therefore, each portion of each of the cutting blades 105 has at least one cutting member or tooth 108 mounted thereon and extending beyond the outer or cutter edge of the elongated blades 105. The cutting members 108 each have one edge 109 positioned normal to the one face of the respective portion of the elongated blades 105 and staggered on adjacent blade portions.

The endless chains 103, 104, and 107 are driven in any suitable manner for moving along the endless path. In the illustrated structure, a hydraulic motor 110 is operatively connected to one of the shafts, for example, the rear shaft 99, as by an endless chain 111 extending between and around suitable sprockets on the rear shaft 99 and the motor 110. It is also preferable that the endless chain 111 has a plurality of cutting members 112 mounted thereon and spaced therealong to prevent ensilage from collecting thereon or otherwise interfering with the operation thereof.

FIG. 7 illustrates means for control of extension and retraction of the boom 6. When the boom 6 is in a selected position, as for example, above horizontal the boom automatically retracts while the boom 6 is being lowered. When the boom is raised above a selected position, such as horizontal, it is progressively extended. The boom is fully retracted as it is lowered below said selected position. In the illustrated structure, a first abutment 113 has a lower end thereof secured to the boom mounting portion 36. The first abutment 113 extends upwardly above the boom 6. A second abutment 114 is spaced forwardly of the first abutment 113 and extends upwardly from the boom 6.

A valve support assembly 115 is mounted on the one end of the boom 6 and a valve thereon is adapted to control flow of fluid to the extensible member 91 thereby controlling extension and retraction of the second boom section 90 and the digger 5 mounted thereon. The valve support assembly 115 includes a first pair of arms 116 positioned adjacent the first abutment 113 and each having a lower end thereof pivotally mounted on the boom 6. The first pair of laterally spaced arms are positioned longitudinally forwardly of the first abutment 113 and rearwardly of the second abutment 113 and rearwardly of the second abutment 114 and thereby between the first and second abutments 113 and 114. The valve support assembly 115 includes a second pair of laterally spaced arms 117 each having a lower end thereof pivotally mounted on the boom 6 and extending upwardly therefrom. The second pair of arms 117 are positioned adjacent the second abutment 114 and are engageable therewith. The valve support assembly 115 includes a valve support member 118 having the upper end of the arms 116 and the arms 117 pivotally connected thereto.

A suitable valve 119 is supported to the valve support member 118 and is operatively connected to the extensible member 91 for controlling extension and retraction thereof. The valve 119 includes a suitable housing having a valve member therein operative in response to relative movement of the housing and valve member to effect control of fluid delivered to the extensible member 91 and thereby control extension and retraction of the second boom section 90.

The valve support assembly 115 is resiliently maintained in engagement with either the first abutment 113 or the second abutment 114 depending upon the position of the boom 6. In the illustrated structure, a resilient member 120 extends between and has opposite end thereof suitably connected to the first abutment 113 and one of the second pair of arms 117. The resilient member 120 is adapted to urge the first pair of arms 116 toward the first abutment 113 and to thereby urge the second pair of arms 117 toward the second abutment 114.

The valve 119 is operatively connected to movement responsive means and movement transmitting linkage which is connected to the second boom section 91 and responsive to extension and retraction of the second boom section 90 relative to the first section of the boom 6.. In the illustrated structure, tubular risers 121 each have lower ends thereof pivotally mounted on the boom 6. Tubular links 122 each have one end thereof pivotally connected to the upper end of a respective one of the tubular risers 121 and the other end thereof pivotally connected to the second boom section adjacent the digger 5 whereby extension and retraction of the second boom section 90 relative to the first section of the boom 6 will effect movement of the tubular risers 121.

Movement of the tubular risers 121 is communicated to the valve member of the valve 119 by means of a suitable movement transmitting linkage extending therebetween. In the illustrated structure, an arm 123 has one end thereof pivotally mounted on the boom and extends upwardly therefrom and the arm 123 is positioned intermediate the ends of the boom 6. A first link 124 extends between the valve member of the valve 119 and the arm 123. The first link 124 is connected by a suitable universal joint to the valve 119 and the other end of the link 124 is pivotally connected to the arm 123 intermediate the ends of the arm 123. A second link 125 extends between the other or upper end of the arm 123 and one of the tubular risers 121. One end of the second link 125 is pivotally connected to the upper end of the arm 123 and the other end of the second link 125 is pivotally connected to one of the tubular risers 121 whereby movement of the tubular risers 121 is transmitted to the valve member of the valve 119.

The tubular risers 121 and tubular links 122 provide means for flow of fluid to the hydraulic motor 110 to drive the digger 5 and the fluid flows to the risers 121 and links 122 from a suitable source of fluid and a pump (not shown).

In using an ensilage loader 1 constructed as illustrated and described, the ensilage loader 1 is moved to a desired position facing an ensilage body. When the boom 6 is is a lowered position below horizontal, the second pair of arms 117 are in engagement with the second abutment 114 and the resilient member 120 maintains said engagement. A suitable engine and pump are activated by an operator to effect flow of fluid to the extensible member 45 to extend same. The boom 6 and digger 5 are thereby raised by extension of the extensible member 45. During raising of the boom 6, the resilient member 120 holds the second pair of arms 117 in engagement with the second abutment 114 thereby holding the valve member of the valve 119 in a neutral position. When the boom 6 has been raised to the selected position, such as a horizontal position, the first paid of arms 116 engage the first abutment 113. The housing of the valve 119 is thereby held against further rearward movement and when the boom 6 is raised above the selected position, the valve member of the valve 119 is thereby moved from a neutral position to a position permitting flow of fluid to the extensible member 91 within the boom 6 for extension of the second boom section 90 and the digger 5 thereon. The linkage between the valve member of the valve 119 and the tubular risers 121 adjust the speed of operation of the extensible member 91 in proportion to the speed of extension of the extensible member 45 to provide a predetermined extension of the boom as its upward angle increases. The boom 6 and the ensilage digger 5 thereon may be moved laterally of the frame to position same at a desired location relative to the face of the ensilage body. The mobile frame 2 may be moved to position the digger at a desired location. After the boom 6 has been raised to a selected position, such as horizontal, the resilient member 120 holds the first pair of arms 116 in engagement with the first abutment 113. As the boom 6 and digger 5 are lowered to remove ensilage from the body, the valve member of the valve 119 is adjusted by operation of the linkage and tubular risers 121 thereby causing flow of fluid to an opposite end of the extensible member 91 whereby the second boom section 90 is retracted at a speed corresponding to the downward speed of the boom 6 as controlled by the extensible member 45. When the boom 6 is in a selected position, such as a horizontal position, the second pair of arms 117 engages the second abutment 114 thereby allowing the valve member of the valve 119 and the support assembly 115 to move as a unit with the boom 6. There is no further relative movement between the housing and the valve member of the valve 119. Retraction of the extensible member 91 is thereby stopped and when the stop 85 engages the bracing member 52 in the receiver 3, the movement of the elongated blades 105 moves the ensilage into the receiver 3 where rotation of the elongated shaft 53 moves the auger flights 54 and 55 and the paddles 56 to move the ensilage through the discharge opening 51 and into the elevator 4 where the scrapers 65 move same toward and through the discharge head 59 of the elevator 4 and into a suitable receptacle, such as a feed mixer or the like (not shown).

The ensilage loader 1 includes suitable controls mounted adjacent an operator's station 126 whereby movement of the mobile frame 2 relative to an ensilage body (not shown), raising and lowering of the boom 6 with the digger 5 thereon, swinging the boom 6 and digger 5 laterally of the receiver 3, and raising and lowering the receiver 3 may all be controlled by an operator at the operator's station 126.

It is to be understood that while I have illustrated and described one form of my invention, it is not to be limited to the specific form or arrangement of parts herein described and shown.

What I claim and desire to secure by Letters Patent is:

1. An ensilage loader comprising:
   a. a mobile frame having a superstructure carried thereby;
   b. an elongated sectional boom with one section having a mounting portion at one end thereof and another section having a free end portion remote from said one section, said other section being movably supported by said one section for longitudinal extension and contraction of said boom;
   c. means on said superstructure pivotally mounting said boom mounting portion of said one boom section;
   d. extensible means on said superstructure and connected to said one boom section and operative for selective up and down swinging movement of said boom;
   e. digger means mounted at the free end portion of said other boom section having movable blades operable to cut a face of an ensilage body engaged thereby as said boom is swung downwardly, the transverse line of the cut being substantially normal to the longitudinal line of said boom;
   f. boom extending means operatively connected between said one boom section and said other boom section for extending and contracting said sectional boom;
   g. means responsive to raising and lowering of said boom for actuating said boom extending means to extend the boom and contract the boom at a predetermined rate as said boom is raised and lowered respectively above a horizontal position to permit said digger means to provide a cut without an overhang at an upper portion of the ensilage body; said means comprising:
      1. a valve operatively connected to said boom extending means and having means for controlling extending and contracting said sectional boom, said means for controlling extending and contracting said sectional boom having a neutral position;
      2. a valve support assembly pivotally mounted on said boom and having said valve mounted thereon;
      3. movement transmitting linkage extending between and operatively connected to said other boom section and to said means for controlling extending and contracting said sectional boom whereby movement of said other boom section effects corresponding movement of said valve support assembly;
      4. spaced abutment members each engageable by said valve support assembly and positioned to define limits for movement of said valve support assembly; and
      5. resilient means extending between and connected to said valve support assembly and to one of said spaced abutment members for urging said valve support assembly toward said one abutment member and said means for controlling extending and contracting of said sectional boom to the neutral position.

2. An ensilage loader comprising:
   a. a mobile frame having a base portion and a tower portion extending upwardly from said base portion and having an upper end, said mobile frame having means thereon for effecting selected forward and reverse movement of said mobile frame;
   b. an elongated boom having one end thereof mounted on the upper end of said tower portion, said boom and said tower portion having cooperating means thereon for selectively raising and lowering the other end of said boom and cooperating means for selectively swinging the other end of said boom laterally of said frame;
   c. an ensilage digger mounted on the other end of said boom and adapted to remove ensilage from an ensilage body and to move the removed ensilage toward said frame, said ensilage digger being operative to cut a face of an ensilage body engaged thereby as said boom is swung downwardly, the transverse line of the cut being substantially normal to the longitudinal line of said boom;
   d. means responsive to raising and lowering the other end of said boom for extending and retracting said ensilage digger at a predetermined rate as said boom is raised and lowered respectively above a horizontal position to permit said digger provide a cut without an overhang at upper portion of the ensilage body; said means comprising:
      1. extensible means operatively connected to said ensilage digger;
      2. a valve operatively connected to said extensible means and having means for controlling extending and contracting of said extensible means, said means for controlling extending and contracting of said ensilage digger having a neutral position;
      3. a valve support assembly pivotally mounted on said boom and having said valve mounted thereon;
      4. movement transmitting linkage extending between and operatively connected to said ensilage digger and to said means for controlling extending and contracting of said extensible means whereby movement of said digger effects corresponding movement of said valve support assembly;

5. spaced abutment members each engageable by said valve support assembly and positioned to define limits for movement of said valve support assembly;

6. resilient means extending between and connected to said valve support assembly and to one of said spaced abutment members for urging said valve support assembly toward said one abutment member and said means for controlling extending and contracting of said ensilage digger to the neutral position thereof;

e. an ensilage receiver mounted on said frame and positoned to receive the removed ensilage, said ensilage receiver having opposite ends and a discharge opening therebetween and means extending between the opposite ends of said ensilage receiver for moving the received ensilage toward the discharge opening; and f. an elevator mounted on said frame and communicating with the discharge opening of said ensilage receiver and extending upwardly and outwardly therefrom, said elevator having means therein for moving ensilage received from the discharge opening of said ensilage receiver through said elevator for discharge therefrom.

3. An ensilage loader as set forth in claim 13 wherein said ensilage digger comprises:

a. a digger frame having laterally spaced side members each having opposite ends;

b. a plurality of elongated angular blades each extending substantially normal to said side members of said digger frame; and c. means for mounting said blades in spaced apart relation with one face of each of said blades being flat and movable toward said ensilage receiver and for moving same in an endless generally triangular path around the opposite ends of said digger frame side members, said endless path having one portion for movement of the one face of said blades toward said ensilage receiver when positioned adjacent thereto.

4. An ensilage loader as set forth in claim 3 including at least one cutting tooth for each of said blades, said cutting teeth each extending beyond the one face of said respective glade and positioned normal thereto.

5. An ensilage loader as set forth in claim 1 wherein:

a. said boom has a first section and a second section, said first section having a mounting portion at the one end of said boom, said second section having said ensilage digger mounted at the other end of said boom;

b. the upper end of said tower portion has means pivotally mounting said mounting portion of said first section thereon;

c. said cooperating means on said boom and said tower portion for selectively raising and lowering the other end of said boom includes extensible means extending between said tower portion and said first boom section and operative for selective up and down swinging movement of said boom;

d. said cooperating means on said boom and said tower portion for selectively swinging the other end of said boom laterally of said frame includes extensible means extending between the upper end of said tower portion and said mounting portion of said first boom section and operative for selective lateral swinging movement of said boom; and e. said boom includes boom extending means operatively connected between said first boom section and said second boom section for extending and retracting said second boom section and said ensilage digger thereon.

6. An ensilage loader comprising:

a. a mobile frame;

b. an elongated sectional boom with one section having a mounting portion at one end thereof and another section having a free end portion remote from said one section, said other section being movably supported by said one section for longitudinal extension and contraction of said boom;

c. means on said mobile frame pivotally mounting said boom mounting portion of said one boom section;

d. means on said mobile frame and connected to said one boom section and operative for selective up and down swinging movement of said boom;

e. digger means mounted at the free end portion of said other boom section;

f. boom extending means operatively connected between said one boom section and said other boom section for extending and contracting said sectional boom;

g. means responsive to raising and lowering of said boom for actuating said boom extending means to extend the boom and contract the boom at a predetermined rate as said boom is raised and lowered respectively above a horizontal position, said means comprising:

1. a valve operatively connected to said boom extending means and having means for controlling extending and contracting said sectional boom which said controlling means has a neutral position;

2. a valve support assembly pivotally mounted on said boom and having said valve mounted thereon;

3. movement transmitting linkage extending between and operatively connected to said other boom section and to said controlling means whereby movement of said other boom section effects corresponding movement of said valve support assembly;

4. spaced abutment members each engageable by said valve support assembly and positioned to define limits for movement of said valve support assembly; and 5. means urging said valve support assembly toward one abutment member and said controlling means to the neutral position.

* * * * *